United States Patent

[11] 3,620,888

| [72] | Inventor | Harold O. Buzzell<br>Wollaston, Mass. |
|---|---|---|
| [21] | Appl. No. | 577,578 |
| [22] | Filed | Sept. 2, 1966 |
| [45] | Patented | Nov. 16, 1971 |
| [73] | Assignee | Polaroid Corporation<br>Cambridge, Mass. |

[54] TRANSPARENT LAMINATE HAVING AT LEAST ONE LAYER OF A CELLULOSE DERIVATIVE MATRIX CONTAINING INFRARED ABSORBER
9 Claims, 1 Drawing Fig.

[52] U.S. Cl............................................. 161/1,
8/4, 117/33.3, 161/249, 161/265, 161/267, 161/269,
161/408, 252/300, 350/1, 350/155, 351/49
[51] Int. Cl........................................ B32b 23/14,
G02b 5/22, G02c 7/10
[50] Field of Search............................................. 350/154,
155, 1; 252/300; 117/33.3, 60, 62, 62.1, 63, 73,
86, 145; 156/100; 260/327; 161/1, 249, 267, 269,
408, 411; 351/49; 8/4, 130

[56] References Cited
UNITED STATES PATENTS

| 2,167,234 | 7/1939 | Dreyfus.......................... | 8/130 X |
| 2,370,697 | 3/1945 | Tillyer............................. | 351/49 X |
| 3,078,178 | 2/1963 | Ostberg.......................... | 117/86 X |
| 3,097,106 | 7/1963 | Blout et al. ................... | 161/249 X |

FOREIGN PATENTS

| 583,842 | 1/1947 | Great Britain................ | 351/49 |

Primary Examiner—John T. Goolkasian
Assistant Examiner—R. A. Killworth
Attorneys—Brown and Mikulka, Stanley H. Mervis and Alvin Isaacs ABSTRACT: Novel improved dye layers especially suitable for use in plastic laminations, such as those involved in plastic optical products. The layer comprises a dye substantially uniformly dispersed in a cellulose derivative matrix wherein one surface of the matrix has been converted to cellulose.

PATENTED NOV 16 1971 3,620,888
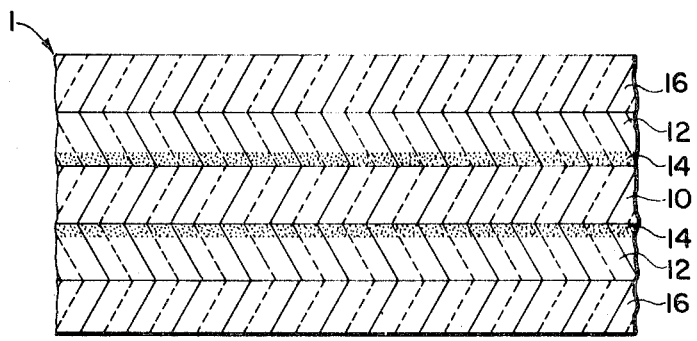
INVENTOR.
Harold Otis Buzzell
BY
Brown and Mikulka
and
Alvin Isaacs
ATTORNEYS

TRANSPARENT LAMINATE HAVING AT LEAST ONE LAYER OF A CELLULOSE DERIVATIVE MATRIX CONTAINING INFRARED ABSORBER

This invention relates to dye-containing layers and more particularly to layers or coatings comprising a dye in a cellulose derivative matrix, and to the treatment of such layers or coatings to render them suitable for lamination in the preparation of plastic elements containing the same.

A primary object of this invention therefore, is to provide dye-containing layers suitable for use in plastic laminations.

Another object is to provide novel procedures for modifying the outer surface of a dye-containing layer cast on a suitable sheet material to render this surface adaptable for lamination to a plastic material.

Still another object is to provide novel procedures for preparing plastic optical elements containing a dye.

A further object is to provide novel procedures for preparing plastic sunglasses having an optical system including light-polarizing means and at least one infrared absorber.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein:

The FIGURE is an enlarged diagrammatic sectional view of a novel lens system for sunglasses or the like which may be prepared in accordance with this invention.

It is frequently desirable to provide plastic laminations containing a dye or dyes, i.e., a substance or substances which absorb visible and/or invisible radiation in a particular region or regions of the light spectrum. A particularly useful procedure for incorporating such dyes is by casting them as a viscous solution of the dye and a cellulose derivative, e.g., a transparent or substantially transparent thermoplastic cellulose ester such as cellulose triacetate, cellulose acetate propionate, cellulose acetate butyrate, etc., in a suitable organic solvent such as chloroform, methylene dichloride, toluene, tetrahydrofuran, etc., or a mixture of such solvents.

The thickness of such coatings may vary over wide ranges, depending upon the usage contemplated. By way of illustration, they may, for example, be on the order of from about 0.1 to about 5.0 mils thick. It has been found that such cellulose derivatives frequently do not provide a suitable bonding surface for direct lamination to other plastic materials such as polyvinyl alcohol. Consequently, it has heretofore been suggested that an additional layer or layers be placed between a cellulose derivative layer and another plastic layer for purposes of lamination, the additional layer or layers providing the requisite bonding surface for the lamination. However, such procedures have been found to be unsatisfactory in the case of dye-cellulose derivative layers to which this invention is directed, since these additional layers in general contain other substances, e.g., nitrates, which may degrate or otherwise adversely affect the dye in the dye-cellulose derivative layer.

It has now been found that the desired laminating surface may be obtained by treating the surface of the dye-cellulose derivative layer subsequent to casting in such a manner as to convert the cellulose derivative on the surface to cellulose, e.g., by hydrolysis of a cellulose ester matrix. This hydrolysis, which surprisingly results in no significant loss, if any, of dye, may be accomplished by treating the dye-cellulose derivative layer with a suitable alkaline medium for a period of time sufficient to provide the desired surface hydrolysis. The time and temperature of this treatment may vary over wide limits and is at least in part dependent upon the materials employed e.g., the nature of the dye-cellulose derivative layer and the alkaline treating solution. In any event, the selection of the particular operating conditions are readily ascertainable by those skilled in the art to which this invention is directed. Preferably, the time and temperature of treatment are selected so as to effect the desired conversion essentially only on the surface of the layer.

As examples of useful alkaline materials which may be employed in this hydrolysis, mention may be made of sodium hydroxide, potassium hydroxide, lithium hydroxide, etc. The solvent may be water or it may comprise water and a water-miscible organic solvent. The presence of an organic solvent, e.g., methanol, has been found to lower materially the processing time necessary for conversion of the surface to cellulose. This lowering of processing time is believed to be due to a swelling by the solvent of the cellulose derivative, thereby facilitating reaction and the subsequent conversion to cellulose.

Following the surface hydrolysis or conversion to cellulose, the layer is then washed and dried to remove excess moisture to provide a suitable bonding surface for preparation of the lamination.

A dye layer prepared in the foregoing manner accordingly comprises a dye dispersed substantially uniformly in a cellulose derivative matrix, the surface of which is essentially cellulose.

The present invention is particularly useful in the preparation of plastic optical elements such as are described and claimed in the commonly signed copending application of Stanley M. Bloom, Ser. No. 577,576 filed concurrently herewith. The invention may accordingly be further understood by reference thereto.

In the aforementioned copending application there are disclosed novel plastic optical products containing an infrared absorbing dye. Included within the scope of these plastic optical products are sunglasses having a plastic lens system including light-polarizing means and at least one infrared absorber, such as illustrated in the accompanying drawing.

As shown therein the plastic lens system has its outer surfaces provided with an abrasive-resistant coating 16. Between these outer layers are positioned, as by lamination, a pair of substantially or effectively transparent sheets of plastic 12, e.g., cellulose acetate butyrate, cellulose acetate propionate, cellulose acetate, ethyl cellulose, etc., a pair of layers or coatings 14 containing at least one infrared absorber, and a polarizing sheet material 10, e.g., a molecularly oriented polyvinyl alcohol sheet which has been stained with iodine to render it light-polarizing and which may have been borated. Light-polarizing materials and abrasive-resistant coatings useful in such elements and plastic laminations including the same are disclosed, for example, in U.S. Pat. Nos. 2,237,567; 2,527,400; 2,554,850; 3,081,192; 3,097,106. The boration of such light-polarizing materials is disclosed, for example, in U.S. Pat. Nos. 2,445,579; Re. 23,297; and 2,554,850.

In addition to the layers or coatings shown on the drawing, the element may contain other layers introduced to provide suitable bonding surfaces to insure obtaining a strong lamination.

As is disclosed in the aforementioned copending application, the preferred class of infrared absorbers employed in such plastic optical elements may be defined as a metal complex of a bis-[cis-1,2-bis-(alkyl, hydrogen, aryl or heterocyclic)ethylene-1,2-dithiolate]. They may also be defined more simply as ene dithiol metal complexes.

These infrared absorbers may be represented by the following formula:

(A)

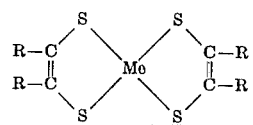

wherein:

Me is a metal of the first, second or third transition metal series, i.e., those elements of group VIII of the table of periodic arrangement of the elements, e.g., nickel, palladium, or platinum, which will provide a complex which is an effective IR absorber and which is substantially or effectively transparent to light in the visible region of the spectrum, e.g., from about 400–700 μ, each R, which may be the same or different, is hydrogen alkyl, an aromatic or heterocyclic ring, or a substituted derivative thereof, e.g., alkoxyalkyl, alkyl and/or alkoxy-substituted aromatic and heterocyclic rings, substituents of the foregoing description containing electron withdrawing groups, etc.

As examples of useful alkyl radicals contemplated by said R moieties, mention may be made of lower alkyl radicals containing one to six carbon atoms, e.g., methyl, ethyl, propyl, isopropyl, butyl, etc. As example of useful aromatic rings, including substituted derivatives thereof, mention may be made of phenyl, naphthyl, methyl-phenyl, methylnaphthyl, alkoxphenyl and alkoxynaphthyl, e.g., dodecyloxyphenyl, halo-substituted, particularly fluoro-substituted, haloalkyl-substituted, e.g., trifluoromethyl-substituted phenyl and naphthyl radicals, etc.

As examples of useful heterocyclic rings, mention may be of those of the formula:

where X is nitrogen, oxygen, or sulfur, and substituted derivatives thereof, including benz-substituted derivatives.

The following compounds are illustrative of useful IR absorbers within the scope of formula (A):

(1)
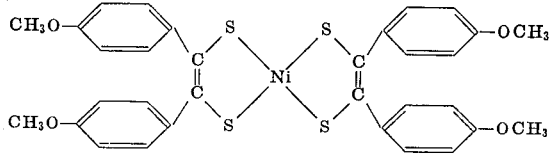

(2)
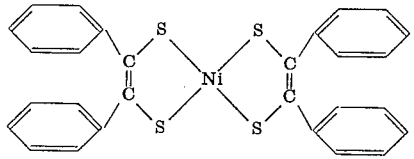

(3)
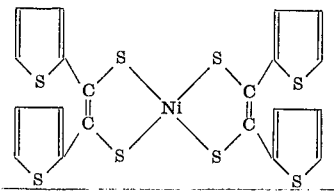

(4)
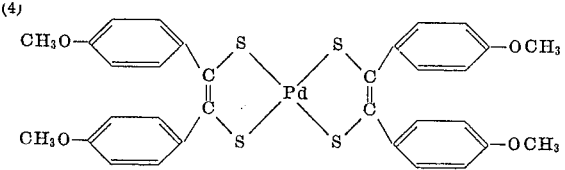

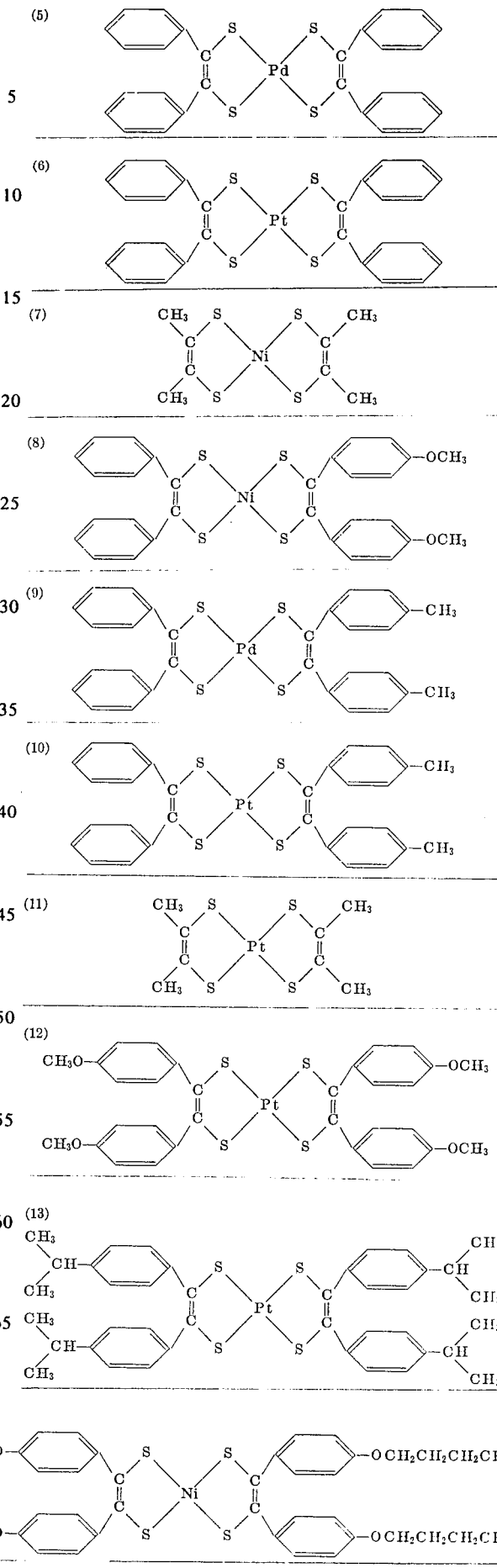

(14)
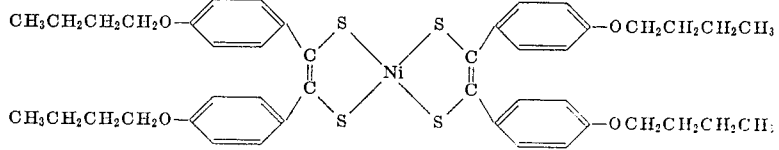

(15) 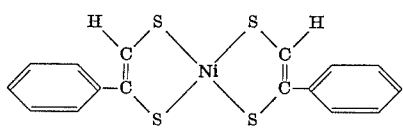

(16) 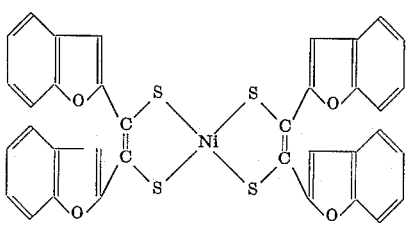

(17) 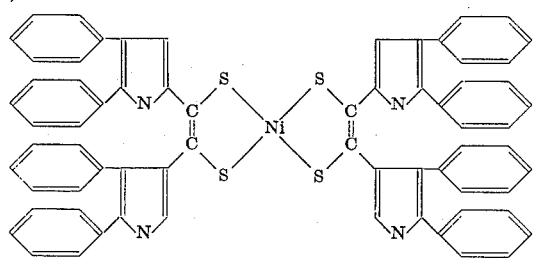

(18) 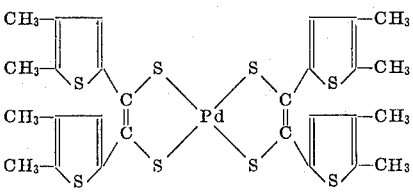

(19) 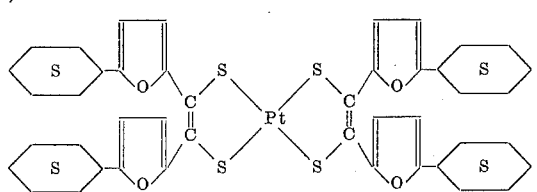

In preparing such optical elements in accordance with this invention, a viscous coating solution comprising the desired dye, e.g., an IR absorbing dye within the scope of formula A such as those illustrative dyes previously mentioned, and cellulose derivative in a suitable organic solvent is cast upon a suitable surface, e.g., upon the transparent sheet material 12 of the element shown in the drawing, to provide a layer thereon of a predetermined thickness and containing a predetermined amount of dye. The thus formed dye-cellulose derivative layer is then treated in the manner heretofore mentioned to convert the surface thereof to cellulose, thereby rendering it suitable for subsequent lamination. At this point, an abrasive-resistant coating may be, and in the following illustrative example was, applied to the opposed outer surface of the sheet material. The desired plastic material, e.g., the light-polarizing material, may now be laminated to the treated outer surface of the dye-containing layer or between two such layers, each contained on a separate sheet material, in accordance with conventional laminating techniques known in the art.

The following example shows by way of illustration and not by way of limitation the practice of this invention.

EXAMPLE

To 100 cc. of chloroform was added 7.5 g. of cellulose acetate butyrate chips. To the resulting viscous solution was added a second solution containing 0.1 g. of the IR absorber of formula 1, 0.1 g. of the IR absorber of formula 7, and 0.02 g. of "Calco Oil Violet ZIRS" (trade name of American Cyanamid Company for a violet dye which was employed to provide a neutral gray product) in 20 cc. of chloroform. The resulting mixture was coated on to each of two sheets of clear cellulose acetate butyrate at a speed of 6 ft./min. to provide on each sheet a layer containing 0.020 g. of combined IR absorbers per sq. ft. of surface area, the layer or coating being approximately 0.3 mil thick. On the free surface of each sheet of cellulose acetate butyrate (the surface opposed from that containing the IR absorber coating) there was then applied an abrasive-resistant coating such as described in example 1 of the aforementioned U.S. Pat. No. 3,097,106 containing 0.6 percent by weight of "Uvinul 490" (trade name of General Aniline Company for an ultraviolet light absorber). The cellulose acetate butyrate on the surface of each of the IR absorber-cellulose acetate butyrate coating was converted to cellulose by treating it with a 1:1:1 solution of sodium hydroxide, methanol and distilled water for 16 seconds at 46°C. The converted surface of each sheet was then washed and the two sheets were heated in an oven to drive off excess moisture. A solution containing 1.5 g. of polyvinyl alcohol (PVA) in 66.7 cc. of water and 33.3 cc. of methanol was coated on each of the converted surfaces at 6 ft./min. to provide a suitable bonding surface for the polarizer to be laminated therebetween. A molecularly oriented PVA (stretched four times its original length) was laminated to the PVA coating on one of the sheets at room temperature by applying to the respective laminating surfaces a laminating dope comprising a 2 percent PVA solution in water and pressing the surfaces together. The molecularly oriented PVA was then stained by imbibition in an iodine solution to render it light-polarizing. It was then imbibed in a boric acid solution of low concentration, dried in vacuo to remove excess liquid, and baked in a heating chamber to dry. The other sheet was then laminated in a similar manner to the free outer surface of the polarizer to provide a plastic optical product containing two of the IR absorbers.

In the foregoing description illustrating the practice of this invention, reference has been made to dye-containing layers wherein the dye employed is an infrared absorber. It will be appreciated that the invention is not limited thereto and the invention is equally applicable to dye-containing layers wherein other dyes exhibiting spectral absorption characteristics in various other regions of the spectrum are employed. In general, it may be stated that the invention is applicable to dye-cellulose derivative layers wherein the dye employed is not adversely effected by the treatment converting the surface of the cellulose derivative to cellulose, e.g., by alkali or an alkaline solution. For example, to prevent any appreciable loss of dye, the dyes employed should preferably be substantially alkali-insoluble.

Since certain changes may be made in the above product and processes without departing from the scope of the invention herein involved, it is intended that all matter contained in the above description or shown in the accompanying drawing shall be interpreted as illustrative and not in a limiting sense.

What is claimed is:

1. A substantially transparent laminate comprising a substantially transparent sheet material laminated to the first surface of a layer comprising an infrared absorber dispersed uniformly in a substantially transparent cellulose derivative matrix having the second surface thereof converted to cellulose and wherein said infrared absorber is a metal complex of a bis-[cis-1,2-(alkyl, hydrogen, aryl or heterocyclic)ethylene-1,2-dithiolate].

2. A laminate of claim 1 wherein said metal complex is of the formula:

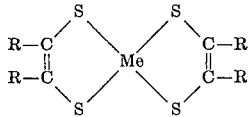

wherein Me is selected from the group consisting of metals of the first, second and third transition metal series which will provide a complex that is an effective infrared absorber and which is effectively transparent to light in the visible region of the spectrum; and each R is selected from the group consisting of hydrogen, alkyl, aromatic rings and heterocyclic rings.

3. A laminate of claim 2 wherein said cellulose derivative matrix comprises cellulose acetate butyrate.

4. A laminate of claim 2 wherein said Me moiety is selected from the group consisting of nickel, platinum and palladium.

5. A laminate of claim 2 comprising a mixture of metal complexes of the following formulas:

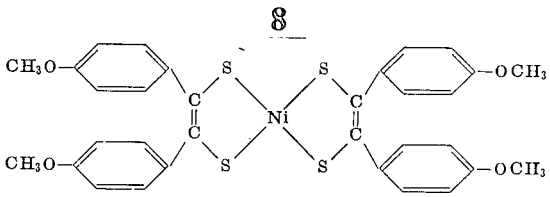

and

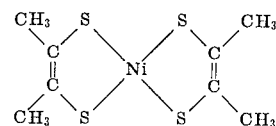

6. A laminate comprising a sheet of light-polarizing material interposed between two laminates of claim 2 and wherein said sheet of light-polarizing material is laminated to said second surfaces of said laminates.

7. A laminate of claim 6 wherein said cellulose derivative matrix comprises cellulose acetate butyrate.

8. A laminate of claim 6 wherein said Me moiety is selected from the group consisting of nickel, platinum and palladium and said cellulose derivative matrix comprises cellulose acetate butyrate.

9. A laminate comprising a sheet of light-polarizing material laminated to said second surface of at least one laminate of claim 1.